United States Patent [19]
Valassis et al.

[11] 3,978,455
[45] Aug. 31, 1976

[54] I/O STRUCTURE FOR MICROPROCESSOR IMPLEMENTED SYSTEMS

[75] Inventors: John G. Valassis, Des Plaines; James R. Holden, Chicago, both of Ill.

[73] Assignee: GTE Automatic Electric Laboratories Incorporated, Northlake, Ill.

[22] Filed: Sept. 9, 1974

[21] Appl. No.: 504,599

[52] U.S. Cl. ............................................. 340/172.5
[51] Int. Cl.² ....................... G06F 3/04; G06F 9/10; G06F 9/12
[58] Field of Search ..................... 340/172.5, 147

[56] References Cited
UNITED STATES PATENTS

| | | | |
|---|---|---|---|
| 3,550,133 | 12/1970 | King et al. ..................... | 340/172.5 |
| 3,593,289 | 7/1971 | Lerch............................. | 340/147 |
| 3,651,484 | 3/1972 | Smeallie......................... | 340/172.5 |
| 3,673,576 | 6/1972 | Donaldson, Jr................. | 340/172.5 |
| 3,714,635 | 1/1973 | Hamilton et al................ | 340/172.5 |
| 3,737,869 | 6/1973 | Trelut et al..................... | 340/172.5 |
| 3,753,243 | 8/1973 | Ricketts, Jr. et al............ | 340/172.5 |

*Primary Examiner*—Gareth D. Shaw
*Assistant Examiner*—Melvin B. Chapnick

[57] ABSTRACT

Apparatus for selecting the operational mode of a particular input/output device in an expandable modular electronic data processing system employing microprocessor devices and testing the I/O device without the use of additional input/output addresses. Input/output interface modules associated with corresponding ones of the I/O devices include a plurality of flip-flops having corresponding memory addresses associated therewith for testing and selecting the operational mode of the I/O device in accordance with the contents of the flip-flops.

4 Claims, 3 Drawing Figures

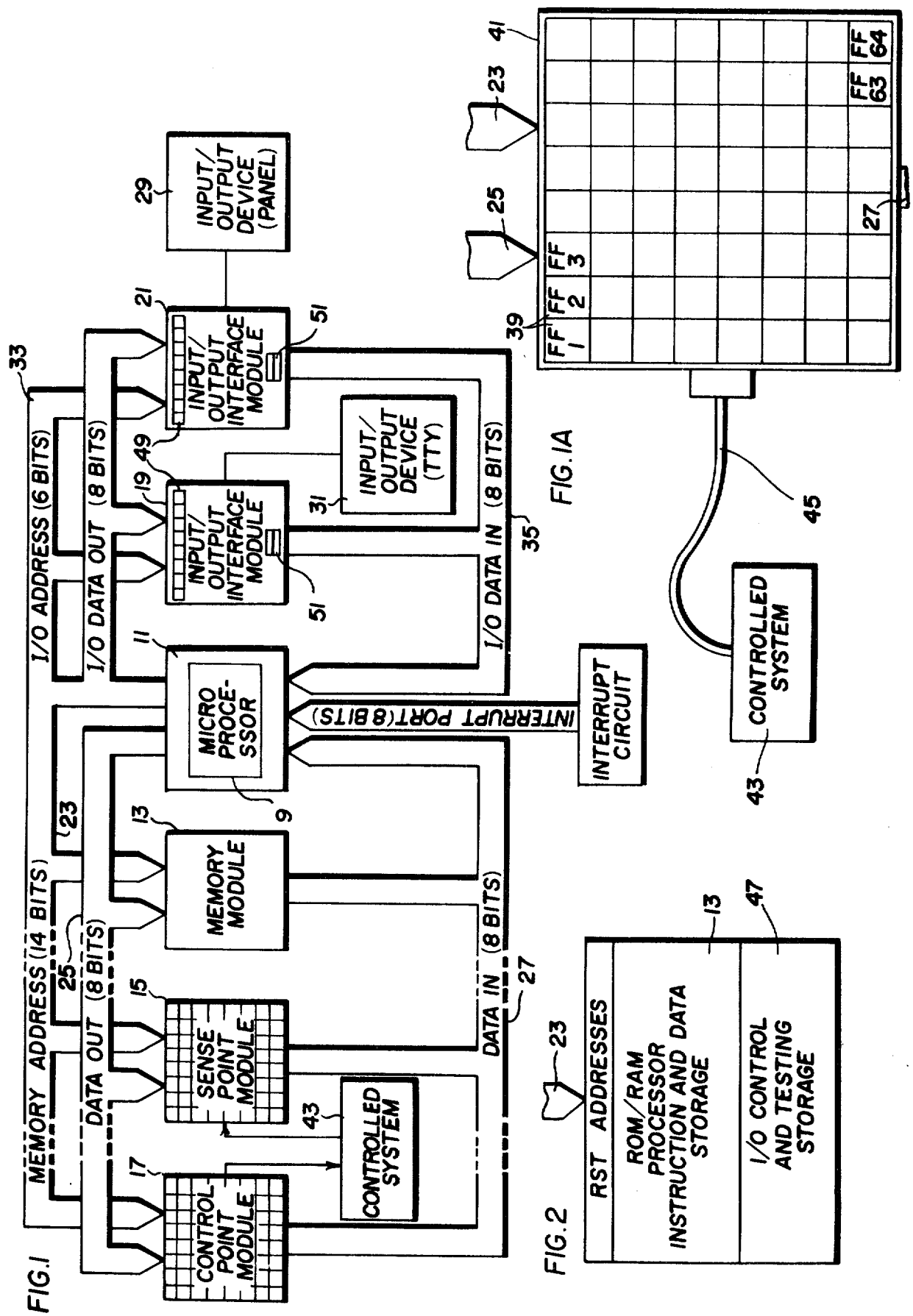

I/O STRUCTURE FOR MICROPROCESSOR IMPLEMENTED SYSTEMS

BACKGROUND OF THE INVENTION

This invention relates to an expandable modular control system employing a universal microprocessor module comprising a microprocessor device having an improved input/output structure.

Reference may be made to the following U.S. Pat. Nos. 3,559,187; 3,725,864; 3,665,404; 3,573,741; 3,564,502; 3,544,966; 3,544,965; 3,514,758; 3,570,542; 3,413,612; and 3,372,378.

With the introduction of LSI/MOS microprocessor devices employing primarily software, i.e., programming in their data processing operations, a new generation of versatile electronic data processing (EDP) systems which can be adapted to a wide variety of control system applications through substitution of new control programs has been developed. One such system is described in the copending U.S. patent application Ser. No. 474,570 of J. Valassis, J. Holden, and M. Mehta assigned to the assignee of the present invention. Although the resulting flexibility afforded the control system enables it to meet the requirements of a wide range of different control system applications, its use is limited somewhat by its memory capacity and the number of input/output devices with which it can interface, characteristics which for the most part are determined at manufacture.

For example, the instruction set of a typical microprocessor device provides for data transfer between the microprocessor and up to 32 peripheral devices. Eight of the input/output (I/O) addresses are assigned to input (INP) date to the system while 24 of the I/O addresses are utilized to output (OUT) data.

There are no specific instructions, however, which allow mode selection and testing of the corresponding input/output (I/O) devices. For example, it may be desirable to have the capability of selecting one of several modes of operation for a particular I/O device as well as the capability to test the status or condition of the various I/O devices under program control.

One method of accomplishing this has been to assign additional I/O addresses dedicated to the mode selection and testing functions to each I/O device. To illustrate, a Teletype would require one OUT address assigned to mode selection, e.g., receive only, receive and echo,, output, etc., and INP address for device testing, e.g., device Ready, in addition to the INP and OUT data device addresses. Thus, a Teletype would require the exclusive use of four of the available I/O addresses. Of course, since the microprocessor has only limited I/O address capability, this method further reduces the number of I/O devices which can be utilized.

SUMMARY OF THE INVENTION

In accordance with the present invention, an expandable modular electronic data processing system incorporating apparatus for inputing and outputing data from the system to a plurality of peripheral input/output devices without using additional input/output addresses is provided. In an embodiment of the invention, the expandable modular electronic data processing system comprises a memory module for storing the data words and the instructions comprising a control program at corresponding memory addresses therein, and at least one microprocessor is included for processing the data in accordance with the control program;

One or more input/output interface modules having corresponding input/output devices associated therewith are provided for inputing data to the microprocessor and for outputing processed data therefrom.

The input/output interface modules include a plurality of flip-flops having corresponding memory addresses associated therewith for selecting the mode of operation of the associated input/output device and for testing the device in accordance with the contents of the flip-flops.

A system bus including an address bus and a data transfer bus intercouples the microprocesor with the memory module means and the input/output interface modules, the microprocessor addressing the flip-flops via the system bus.

BRIEF DESCRIPTION OF THE DRAWINGS

The invention may be best understood, however, by reference now to the following description taken in conjunction with the accompanying drawings, in which like reference numerals identify like elements in the several figures and in which:

FIG. 1 is a block diagram of an expandable modular control system employing a universal microprocessor module and incorporating the novel input/output apparatus of the present invention;

FIG. 1A illustrates in greater detail the sense point module of the expandable modular control system shown in FIG. 1; and FIG. 2 illustrates the division of the memory capacity of the system shown in FIG. 1 for implementing the novel input/output apparatus of the present invention.

DETAILED DESCRIPTION

In accordance with the present invention, there is hereinafter shown and described apparatus for selecting the operational mode of a particular input/output (I/O) device in an expandable modular electronic data processing (EDP) system employing microprocessor devices and testing the I/O device without the use of additional input/output (I/O) addresses.

Although the novel input/output (I/O) apparatus hereinafter shown and described can be readily implemented with any of a number of commercially available microprocessor devices, in a working embodiment of the present invention, the Intel 8008-1 microprocessor device was utilized to illustrate its application. It should be understood, however, that with only minor modifications, which will be apparent to one skilled in the art, other microprocessor devices may be equally well suited for incorporation in the microprocessor module 11.

In particular, the expandable modular electronic data processing system may comprise, for example, a control system employing a universal microprocessor module, e.g., a printed circuit card with one or more microprocessor devices mounted thereon, and separately packaged peripheral support modules or printed circuit cards, such as a memory module, sense point and control point modules, and input/output (I/O) interface of controller modules. These and other peripheral support modules comprise a "library" of functional building blocks which can be selectively combined to implement virtually any modular control system or other electronic data processing system that may be required. Moreover, the control system further includes a busing arrangement for interconnecting the microprocessor module with its peripheral support modules to selectively transfer data between the various modules in accordance with the program controlling the data processing operations of the system.

Referring now to FIG. 1, the modular control system illustrated therein comprises a microprocessor module 11 interconnected with a memory module 13, sense point and control point modules, 15 and 17, respectively, and a pair of input/output (I/O) interface or controller modules, 19 and 21. It should be understood, however, that the particular embodiment shown in FIG. 1 is only by way of example and should not be construed to be the only embodiment. In fact, many different EDP systems can be effected by selectively combining the various modules required for a particular application by means of a busing arrangement.

In particular, the microprocessor module 11 comprises a microprocessor device 9 having: (1) a program register which is incremented after each succeeding instruction in the control program has been executed to correspond to the memory address of the next instruction to be executed in the control program sequence; (2) an instruction register which is sequentially loaded with the instructions comprising the control program responsive to the program register being successively incremented to contain the corresponding memory addresses thereof; (3) an arithemetic-logic unit for processing data in accordance with the control program and including C,Z,S and P flip-flops for indicating the status of the flag bits; and (4) a local memory comprising seven 8-bit registers including an accumulator for registering the data being operated upon in accordance with the instructions then contained in the instruction register, H and L registers which respectively contain the high- and low-order bits of an indirect memory address corresponding to data to be processed in accordance with the instruction, and four other registers for temporary storage of data while it is being processed.

As shown in FIG. 1, the busing arrangement includes a Memory Address bus 23 intercoupling the microprocessor module 11 with the memory module 13 to permit the microprocessor module 11 to address a particular memory location in the memory module 13 by means of a 14-bit memory address. Data is then selectively transferred between the microprocessor module 11 and the memory module 13 via a pair of data transfer buses. In particular, 8-bit data words are transferred over a Data Out bus 25 to the locations in the memory module 13 specified by the memory address while data withdrawn from a specified address in the memory module 13 is transferred to the microprocessor module 11 over an 8-bit Data In bus 27.

The sense point module 15 and the control point module 17 are included to respectively monitor certain selected parameters of the system being supervised by the control system and to apply control signals to the controlled system in response thereto under the direction of the control system. In addition, the sense point and control point modules, 15 and 17,, respectively, function as extensions of the memory module 13 thereby reducing the storage capacity required of the memory module 13 and the cost associated therewith.

This and other advantages may be more clearly understood by reference now to FIG. 1A wherein the sense point module 15 is shown in greater detail. There it may be seen that the sense point module 15 comprises a plurality of flip-flops 39 arranged in a matrix array on a printed circuit card 41. In the present embodiment, for example, 64 flip-flops 39 are arranged in an 8-by-8 matrix. Since the flip-flops 39 are bistable devices which can be set and reset between two stable states, the 8-by-8 array is functionally similar to the array of memory elements comprising the memory module 13. Accordingly, the sense point flip-flop matrix serves as a separate 8-word-by-8-bit extension of the external memory module 13, each 8-bit word in the sense point module 15 corresponding to a particular 14-bit memory address.

The flip-flops 39 comprising the sense point module 15 are also coupled to the system being controlled by the module control system, i.e., controlled system 43, to monitor certain assigned parameters therein. For example, in a telephone communications system, the sense point module 15 may be used to monitor the "on/off hook" status of a plurality of telephones coupled to the system. Access to the relays and other electromechanical equipment comprising the telephone system may be obtained through a cable connector arrangement 45 coupled to the sense point module card 41. Appropriate connections (not shown) may then be made between the connector arrangement 45 and the flip-flops 39 so that the data coupled to the sense point module 15 can be stored, i.e., registered, in the flip-flop matrix as a plurality of 8-bit words, each having a particular 14-bit memory address associated therewith.

Similarly, the control point module 17 also comprises a matrix array of flip-flops arranged to correspond to a plurality of 8-bit words. While the word capacity of the control point module 17 may differ from that of the sense point module 15, depending upon the requirements of the controlled system 43, the control point module 17 is substantially identical to the sense point module 15 in every other respect. The only other limitations placed on modules 15 and 17 are that the word length (8-bits in the present embodiment) must be compatible for processing by the microprocessor device, and each word must have a unique memory address associated therewith.

In FIG. 1, it may be seen that the Memory Address bus 23 to memory module 13 is extended to also couple the sense point module 15 and the control point module 17 to the microprocessor module 11. Accordingly, the microprocessor module 11, responsive to the control program, selectively addresses the sense point module 15 by coupling the 14-bit memory address corresponding to the particular word location wherein the monitored data is stored to the sense point module 15 via the Memory Address bus 23. The data "read" from the sense point module 15 is then transmitted to the microprocessor module 11 via an extension of the Data In bus 27 where it is processed by the microprocessor module 11 in accordance with the control program.

After processing the retrieved data, the microprocessor module 11 may issue control decisions or commands to the control point module 17 in the form of one or more 8-bit "control" words. The particular word location in the control point module 17 where the control word is stored is determined by a 14-bit memory address coupled to the control point module 17 via the extended Memory Address bus 23. The control word is then transferred to control point module 17 by means of an extension of the 8-bit Data Out bus 25 from the microprocessor module 11 and loaded into the corresponding word location, i.e., flip-flops 39. Accordingly, the control point module 17 is then effective to control the controlled system 45 responsive to the control words issued by the microprocessor module 11 in response to the monitored data.

Although the sense point and control point modules, 15 and 17, respectively, have been described as comprising an 8-word-by-8-bit flip-flop matrix array, it will be apparent to one skilled in the art that such an arrangement is for illustrative purposes only and that other similar arrangements are equally well suited for this purpose.

Peripheral input/output (I/O) devices such as, for example, a display panel 29, a teletypewriter (TTY) 31 and the like provide means for inputing data to the microprocessor module 11 and receiving processed data or information therefrom. Again, it should be understood that a wide variety of input/output (I/O) devices are available, each having unique interfacing requirements which must be satisfied if the I/O device is to be operationally compatible with the modular control system of the present invention. Accordingly, corresponding input/output (I/O) interface or controller modules are provided to interface the I/O devices with the control system. Specifically, in the present embodiment, I/O interface module 19 couples the teletypewriter 31 to the remainder of the control system while I/O interface module 21 interfaces the display panel 29. These I/O interface modules function to synchronize the differing operating speeds of their respective associated I/O devices to the microprocessing module 11. Further, the I/O interface modules translate the input data coupled thereto from the corresponding I/O device to a machine-language binary code compatible for processing by the microprocessor module 11.

A 6-bit Input/Output (I/O) Address bus 33, coupling the microprocessor module 11 to the I/O interface modules, 19 and 21, provides a means for addressing a particular I/O device with a corresponding 6-bit address transmitted thereto via the I/O Address bus 33. The 6-bit I/O address permits the addressing of up to 24 I/O devices in the output mode whereby processed data and information is output to the particular I/O device addressed and up to 8 I/O devices in the input mode whereby raw data is obtained from the particular I/O device addressed.

When the I/O address is transmitted, the information to be input or output, as the case may be, is then transferred between the microprocessor module 11 and the addressed I/O device via a data bus and the particular I/O interface module corresponding to the I/O device addressed. More particularly, the input data from a particular I/O device is converted into a sequential plurality of 8-bit words by the corresponding I/O interface circuit and coupled via an Input/Output (I/O) Data In bus 35 to the microprocessor module 11. In like manner, processed data or other information can be transferred from the microprocessor module 11 to a particular I/O device over an 8-bit Input/Output (I/O) Data Out bus 37 coupled to the corresponding I/O interface module.

In accordance with the present invention, a portion of the external memory capacity is set aside for I/O mode selection and testing. As illustrated in FIG. 2, this dedicated memory array 47 may consist of 32 consecutive memory addresses located in an area of external memory 13 not used by the microprocessor 9 for instruction or program data storage. The base address or starting location of the memory array 47 together with the address of the I/O device to be accessed comprises a control word for accessing a particular location in the memory array 47.

In a preferred embodiment, the several flip-flops 49 comprising the memory array 47 are located on the I/O interface or controller card (module) with which they are associated. In particular, eight flip-flops 49, corresponding to one memory address, are provided on each of the I/O devices (8 to input data and 24 assigned to output data). Thus, a particular I/O device, such as teletypewriter 31, can be selected to operate in any one of eight different modes (or disssconnected) by controlling the contents of the eight flip-flops 49 on I/O interface module 19. Similarly, up to eight different I/O status conditions can be read from I/O device 31 under program control testing.

Operationally, the READY line of the microprocessor 9 is used to synchronize the microprocessor 9 with the various I/O devices. In general, when an I/O device such as teletypewriter 31 is selected in the INPUT mode its RDY flip-flop 51 is reset and is set by data available from the I/O INPUT device. The RDY flip-flop 51 is tested under program control, and the device is not accessed by an INP instruction until the RDY flip-flop 51 is true. If the test feature is not used and an INP instruction is entered, the microprocessor 9 goes into the WAIT state during memory cycle two (PPC) and remains there until the RDY flip-flop 51 is set by the I/O INPUT device 31. When the RDY flip-flop 51 becomes true, execution of the INP instruction is completed, data is taken to register A of microprocessor 9 and the RDY flip-flop 51 is reset.

In general, when an I/O device (e.g., panel 29) is selected in the OUTPUT mode, its RDY flip-flop 51 is set and the first OUT instruction transfers data to the I/O OUTPUT device 29, and the RDY flip-flop 51 is reset. The RDY flip-flop 51 is set by the OUTPUT device interface or controller module 21 when the data output operation is complete and the I/O OUTPUT device 29 is ready to receive another character. The OUTPUT device can then be tested for RDY or enter the next I/O OUT instruction directly. If the OUT instruction is entered and the I/O OUTPUT device 29 is not RDY, the microprocessor 9 enters the WAIT state and remains there until the RDY flip-flop 51 becomes true. When the RDY flip-flop 51 becomes true, the data is output to device 29 and the device 29 resets the RDY flip-flop 51 until it is again able to receive data.

Any number of I/O devices may be selected simultaneously. Data is only placed on the I/O buses 35 and 37, however, when the instruction for a particular device address is executed.

A SELECT instruction or subroutine is executed via the memory bus to select the mode for a particular device prior to execution of the INP/OUT data transfer instruction.

The following examples show the type of subroutines to be executed to select and test I/O devices using the memory bus. Assuming that the proposed Microprocessor will be implemented with a Register Save (A,H,L) feature the I/O selection and testing is as follows:

(a) Subroutine for I/O device mode selection

-continued

| | | | |
|---|---|---|---|
| SEL | CAL | SVREG (Subroutine to Save A, H and L Registers) | |
| | LLI | | |
| | | Base Address + I/O Address | |
| | LHI | | |
| | LMI | Select Conditions | |
| | CAL | RSREG (Subroutine to Restore A, H and L Registers) | |
| | RET | Return | |
| (b) | | Subroutine to test I/O device status | |
| TST | CAL | SVREG (Subroutine to Save A, H and L Registers) | |
| | LLI | | |
| | | Base Address + I/O Address | |
| | LHI | | |
| | LAI | Status Word Mask | |
| | NDM | And with Status I/O Control Word | |
| | CAL | RSREG (Subroutine to Restore A, H and L Registers) | |
| | RET | Return | |

Upon Return to the main program the zero (z) CPU status bit may be jump tested to determine if the device status conditions were satisfied. For example, if the RDY flip-flop 51 was tested and found true, a service subroutine may be executed. Otherwise, the microprocessor 9 continues with the main program or tests the device again.

The apparatus of the present invention whereby the memory bus is used to select and test the I/O devices may be further expanded to allow selection of an I/O device under an interrupt mode. This allows the RDY flip-flop 51 of a device controller or I/O interface module to raise an interrupt each time it requires service (i.e., to input or output a character). Each device RDY flip-flop 51 would then generate a unique RST (RESTART) address causing the main program to enter a subroutine to service the interrupting device.

Since only eight RST addresses are available, only eight devices could be operated in this mode. Other uses (such as cold start rutine or other external interrupts) of the RST addresses would further decrease the number of I/O devices which could be operated in the interrupt mode.

Accordingly, there has been shown apparatus whereby only one OUT address is assigned to each output device and one INP address is assigned to each input device for more efficient use of the available I/O device addresses. This enhances the computation power of microprocessor implemented control systems. In so doing, it speeds-up the processing speed, provides flexibility in I/O device selection and testing and reduces the program (memory) requirements.

It should be further understood that the expandable module control system of the present invention is not necessarily limited to use with telephone communication systems, but can be adapted to any system wherein certain system parameters are to be monitored to control the system in accordance with a control program.

While a particular embodiment of the present invention has been shown and described, it will be obvious to those skilled in the art that various changes and modifications can be made without departing from the invention in its broader aspects. Accordingly, the aim in the appended claims is to cover all such changes and modifications as may fall within the true spirit and scope of the invention,

We claim:

1. An expandable modular electronic data processing system for processing data in accordance with instructions arranged as a control program, including,
   modular memory means for storing the processed data and the instructions at corresponding memory addresses therein;
   modular microprocessor means for processing the data in accordance with the control program;
   memory bus means intercoupling the modular memory means and modular microprocessor means including memory address bus means and memory data bus means;
   input/output bus means connected to the modular microprocessor means including input/output address bus means and input/output data bus means;
   a plurality of input/output interface modules, each having a corresponding input/output device associated therewith and each connected to the input/output bus means for transmitting data generated by the corresponding input/output device to the modular microprocessor means for processing and for transmitting processed data generated by the modular microprocessor means to the corresponding input/output device, each input/output interface module including control means for controlling the operation of the corresponding input/output device in response to control data; characterized in that:
   each input/output interface module includes a first addressable register means having a first unique memory address associated therewith and is connected to said memory bus means for receiving and storing control data transmitted by the modular microprocessor means on the memory data bus means in response to the first unique memory address being transmitted by the modular microprocessor means on the memory address bus means, the control data stored in the first addressable register means being utilized by the control means for controlling the operation of the input/output device associated therewith.

2. An expandable modular electronic data processing system in accordance with claim 1 wherein each input/output device has one or more input/output addresses associated therewith, further characterized in that:
   each first unique memory address comprises a base address portion and an input/output address portion corresponding to one of the input/output addresses associated with the corresponding input/output device.

3. An expandable modular electronic data processing system in accordance with claim 1 wherein each input/output interface module includes means for generating status data signals representing the operational status of the corresponding input/output device associated therewith, and further characterized in that:
   each input/output device further includes a second addressable register means for storing the status data signals, each second addressable register means having a second unique memory address associated therewith and being connected to said memory bus means for transmitting the stored status data signals on the memory data bus means to the modular microprocessor means in response to the modular microprocessor means transmitting the second unique address on the memory address bus means.

4. An expandable modular electronic data processing system in accordance with claim 3 wherein each input/output device has one or more input/output addresses associated therewith, further characterized in that:
   each second unique memory address comprises a base address portion and an input/output portion corresponding to one of the input/output addresses associated with a corresponding input/output device.

* * * * *